United States Patent
Hlasny

[19]

[11] Patent Number: 6,044,282
[45] Date of Patent: Mar. 28, 2000

[54] DUAL CLOCK POWER CONSERVATION SYSTEM AND METHOD FOR TIMING SYNCHRONOUS COMMUNICATIONS

[75] Inventor: Daryl James Hlasny, Vancouver, Wash.

[73] Assignees: Sharp Laboratories of America, Inc., Camas, Wash.; Sharp Kabushiki Kaisha, Osaka, Japan

[21] Appl. No.: 08/911,629

[22] Filed: Aug. 15, 1997

[51] Int. Cl.[7] .................................................. H01Q 11/12
[52] U.S. Cl. ........................................... 455/574; 455/127
[58] Field of Search ..................................... 455/574, 550, 455/38.3, 522, 127, 343

[56] References Cited

U.S. PATENT DOCUMENTS

| | | | |
|---|---|---|---|
| 4,254,475 | 3/1981 | Cooney et al. | 364/900 |
| 5,025,387 | 6/1991 | Frane | 364/493 |
| 5,150,361 | 9/1992 | Wieczorek et al. | 370/95.1 |
| 5,274,843 | 12/1993 | Murai et al. | 455/38.3 |
| 5,291,542 | 3/1994 | Kivari et al. | 379/58 |
| 5,392,287 | 2/1995 | Tiedemann, Jr. et al. | 370/95.1 |
| 5,416,435 | 5/1995 | Jokinen et al. | 455/550 |
| 5,461,652 | 10/1995 | Hongo | 368/10 |
| 5,613,235 | 3/1997 | Kivari et al. | 455/343 |
| 5,740,129 | 4/1998 | Frampton | 368/10 |
| 5,815,819 | 9/1998 | Ohta et al. | 455/574 |

Primary Examiner—Reinhard J. Eisenzopf
Assistant Examiner—Marsha D. Banks-Harold
Attorney, Agent, or Firm—David C. Ripma; Matthew D. Rabdau

[57] ABSTRACT

A system is provided to time the periods of known inactivity in a synchronous communications system in such a manner as to allow the high speed oscillator, used in the various timing, modulation, and demodulation operations of a portable communications unit, to be shut off without a significant loss in timing resolution. A low power, low speed, oscillator is used to measure a majority of the inactive period to save battery power. The low speed oscillator has a frequency too slow to provide the resolution necessary for accurate timing. However, a small portion of the inactive period is timed with the high frequency oscillator. The fine resolution of the time segment measured by the high speed oscillator, when combined with segment of time measured by the low speed oscillator, yields a measurement of the inactive period that is approximately the same as obtained when just the high speed oscillator is used. A method of turning off a high speed oscillator in the timing of an inactive period between communications in a synchronous communications system is also provided for the purpose of conserving battery power.

9 Claims, 7 Drawing Sheets

DUAL CLOCK POWER CONSERVATION SYSTEM AND METHOD FOR TIMING SYNCHRONOUS COMMUNICATIONS

BACKGROUND AND SUMMARY OF THE INVENTION

This invention relates generally to wireless communications, and more particularly, to a system and method of conserving power by using a low speed clock to time the intervals between message frames in a synchronous communication system.

Cell telephones, mobile telephones, and paging systems all communicate to a plurality of roaming wireless units from a central base station, or series of base stations. Many of these roaming wire units, whether acting as transceivers or receivers, are battery powered. Therefore, research continues into improving circuits of these mobile units so that they conserve power, resulting in more reliable communications and longer intervals between battery changes, or recharging.

Time division multiplexing access (TDMA) systems have proven to be popular in organizing communications in a cellular or paging type network. A fundamental similarity between TDMA systems involves the linking all roaming players, or portable units, to a common clock in response to signals from the base station. Time is segmented into a plurality of frames, and each receiver is assigned a specific frame in which to monitor communications from the base station. Therefore, in the simplest forms of a TDMA system, a receiver is only required to monitor communications during a segment of time that is relatively small in comparison to the total time.

It is well known to take advantage of the relatively long rest periods between receiving frames to conserve power in battery operated receiver units. Tiedemann, et al., U.S. Pat. No. 5,392,287, discloses a system of power conservation by de-energizing components of the receiver during rest intervals. Shortly before the receiver's communications frame, power is reapplied to the components, and an initialization is performed. However, the initialization of a receiver can be a power intensive activity. Power may also be wasted if an improperly initialized receiver, or a receiver that is out of synch with the system clock must remain powered to monitor a missed communication occurring in subsequent frames.

Kivari, et al., U.S. Pat. No. 5,291,542 disclose a system of power conservation that involves idling a microprocessor clock output signal during inactive periods. However, the system still needs a high resolution input clock to time the rest intervals between communications, gating the microprocessor clock on and off.

Wieczorek, et al., U.S. Pat. No. 5,150,361, discloses a system of saving power in a TDM radio that involves shutting down nonessential circuits during the rest interval. However, the high resolution reference oscillator is left on to perform the timing function.

Murai, et al., U.S. Pat. No. 5,274,843, discloses a system of saving power in a paging circuit which involves shutting off some elements of the receiver until a preamble is detected. Once again, high resolution timing circuitry must remain enabled during the rest period to detect preamble message signals.

As is well known in the art, the power consumption of a CMOS circuit is reduced by reducing its frequency of operation. That is, the power consumption of a CMOS part is proportional to the system clock enabling the circuit. Hongo, U.S. Pat. No. 5,461,652, discloses a system of using a low speed clock, during wait states, to operate the system. Cooney et al, U.S. Pat. No. 4,254,475, disclose a dual frequency clock system that uses a low speed clock during periods of inactivity. Frane, U.S. Pat. No. 5,025,387, discloses a dual frequency clock system to reduce power consumption during periods of inactivity. However, all three of the above-mentioned patents disclose systems where the power conserving unit need not perform the timing necessary to wake itself up. That is, the enable signal which turns the system on, enabling a high speed clock, is delivered from outside the apparatus.

It would be advantageous if a player in a synchronous communication system could conserve power by de-energizing the high resolution clock, or oscillator, required for modulation or demodulation of communication messages, during the periods of inactivity between messages.

It would be advantageous if the rest interval between communication frames in a synchronous communication system could be timed with a low speed, and therefore, low power clock. It would also be advantageous if the communications player could maintain rest interval timing with the resolution of a high speed clock by using a low speed clock.

Accordingly, in a wireless system of communicating players, having a predetermined rest interval between player communications, wherein the rest interval includes a predetermined first wait time and a predetermined second wait time, significantly longer than the first wait time, and players use a high speed clock to execute procedures during a communication, a method for a player to conserve power by using a low speed clock in the measurement of the rest time interval is provided. The method comprises the steps of:

a) using the high speed clock to measure the first wait time, whereby a precisely times rest interval maximizes the possibility of communication between players;

b) de-energizing the high speed clock, whereby power consumption is reduced; and c) using the low speed clock to measure the second wait time, whereby a precise measurement of the rest interval is made with a minimal use of power.

In one aspect of the invention, the rest interval includes a predetermined third wait time, and includes the step, following the measurement of the second wait time in Step c), of using the low speed clock to measure the third wait time. During the third wait time, another step applies power to the high speed clock, stabilizing the high speed clock to operate at a selected period.

One aspect of the invention divides the rest interval by the low speed clock period to obtain a whole number of low speed clock periods, $n_0$, and a remainder approximately equal to the first wait time. The method then includes the step of multiplying the low speed clock period by a predetermined whole number, $n_3$, to measure the third wait time, and Step b) includes multiplying the low speed clock period by $n_2$, where $n_2 = n_0 - n_3$, to measure the second wait time.

One aspect of the invention includes the step of obtaining an $n_0$ value such that the first wait time is greater than, or equal to the low speed clock period, whereby the first wait time is large enough that the rest interval is measured with a non-synchronous clock.

In a wireless network of communicating player units having a predetermined rest interval between player unit communications, wherein the rest interval includes a predetermined first wait time and a predetermined second wait time, significantly longer than the first wait time, a system for a player unit to conserve power between communications is also provided. The system comprises a high speed clock having an input to energize the high speed clock, and an output operatively connected to communication circuits to provide a high speed clock period, $T_1$, whereby the clock is used to execute procedures during a communication. The system comprises a low speed clock with a rate of power consumption that is low compared to the high speed clock, and having an output to provide a low speed clock period, $T_2$. The system comprises a first counter circuit having an input operatively connected to the high speed clock output to determine the first waiting time by counting a predetermined number, $n_1$ of high speed clock periods. The first counter circuit also has an output to provide a first wait time signal after the first wait time is counted.

The system also comprises a second counter circuit having an input operatively connected to the low speed clock output to determine the second wait time by counting a predetermined number, $n_2$ of low speed clock periods. The second counter circuit has an output to provide a second wait time signal after the second wait time is counted.

The system also comprises a power controller circuit having a first input operatively connected to the first counter circuit output, a second input operatively connected to the second counter circuit output, and an output operatively connected to the high speed clock input, to de-energize the high speed clock during the counting of the second wait time, and to energize the high speed clock when the second wait time signal is received. In this manner, the rest interval is precisely timed despite the high speed clock being de-energized for a majority of the rest interval.

In one aspect of the invention the rest interval includes a third wait time and the system further comprises a third counter circuit having a first input operatively connected to the power controller output to trigger the counting of the third wait time when the high speed clock is energized. The third counter also has a second input operatively connected to the low speed clock output. The third counter determines the third waiting time by counting a predetermined number, $n_3$ of low speed clock periods. The third counter circuit has an output to provide a third wait time signal after the third wait time is counted.

The system includes a gating circuit having a first input operatively connected to the high speed clock output, and a second input operatively connected to the third counter circuit output, the gating circuit has an output to provide the high speed clock, enabling the high speed clock period when the third wait time signal is received. In this manner, the high speed clock is allowed to stabilize before being enabled to activate and manage communication circuits.

DETAIL DESCRIPTION OF THE PREFERRED EMBODIMENT

Figure 1:
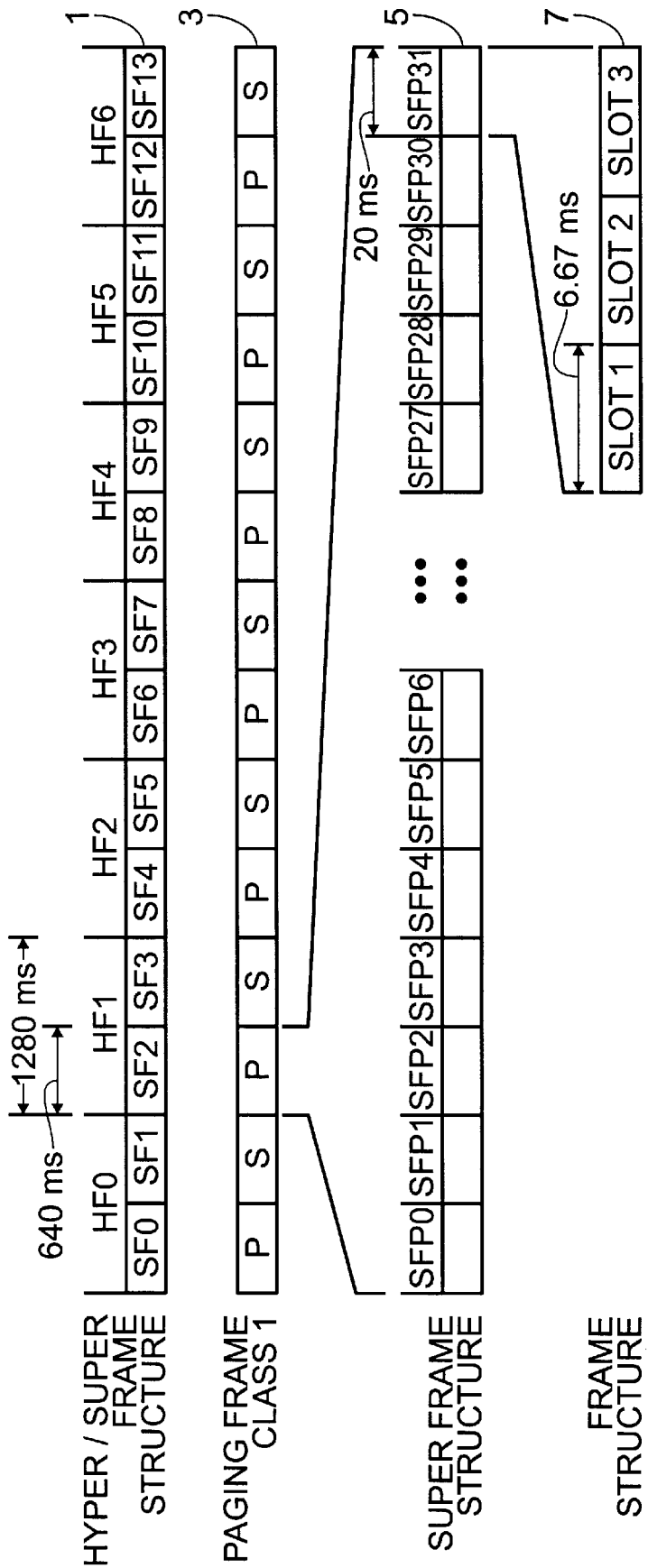
FIG. 1 describes the communications frame structure used on the Digital Control Channel (DCCH) of the IS-136 standard based cellular phone system (prior art).

FIG. 1 describes the communications frame structure used on the Digital Control Channel (DCCH) of the IS-136 standard based cellular phone system (prior art). FIG. 1 depicts the nested framing structure used in the Forward Digital Control Channel, and illustrates the long idle time periods between the active portion of a paging cycle. Trace 1 displays a series of 7 hyperframes (HF), with each containing two superframes (SF). Each unique hyperframe and superframe is identified with a number, with the sequence of frames repeating indefinitely. That is, hyperframe 0 (HF0) follows hyperframe 6 (HF6). Likewise, superframe 0 (SF0) follows superframe 13 (SF13).

Trace 3 shows one case of the four possible Paging Frame classes. Paging frame class 1 is shown. "P" designates the primary paging channel (PCH), while "S" designates the secondary paging channel. The secondary PCH contains a repeat of the paging information found in the primary PCH. A player unit, or receiver, only needs to access the secondary PCH when it fails to read the information contained in the primary PCH. The other Paging Frame classes (not shown) differ only in the number of hyperframes between primary PCHs.

Trace 5 is an expanded view of a single superframe structure of trace 3. Each superframe contains 32 frames designated SFP0 through SFP31. At least one frame is designated as the paging channel (PCH) Typically, a mobile player unit need only monitor a single PCH slot. The selection of SFP31 as the PCH in trace 5 is arbitrary. Alternately, other SFPs may be used.

Trace 7 depicts the TDMA block frame structures with an expanded view of SFP31. SFP31 contains three time slots, each having a duration of 6.67 ms. Typically, a mobile player unit is required to access only one time slot.

The mobile player unit is assigned a Paging Frame Class (PFC), time slot, and SFP through a negotiation process with the communicating base station. In the situation described above, and depicted in FIG. 1, the player unit need only access a single time slot of SFP31 on every other superframe. For example, the player may access time slot 1, of SFP31 for SF0, SF2, SF4. . . , etc. In this manner, the player unit need only monitor a single time slot out of series of 64 time slots. That is, the unit must be prepared to receive a message every 6.67 ms in a period of 1280 ms.

Figure 2:
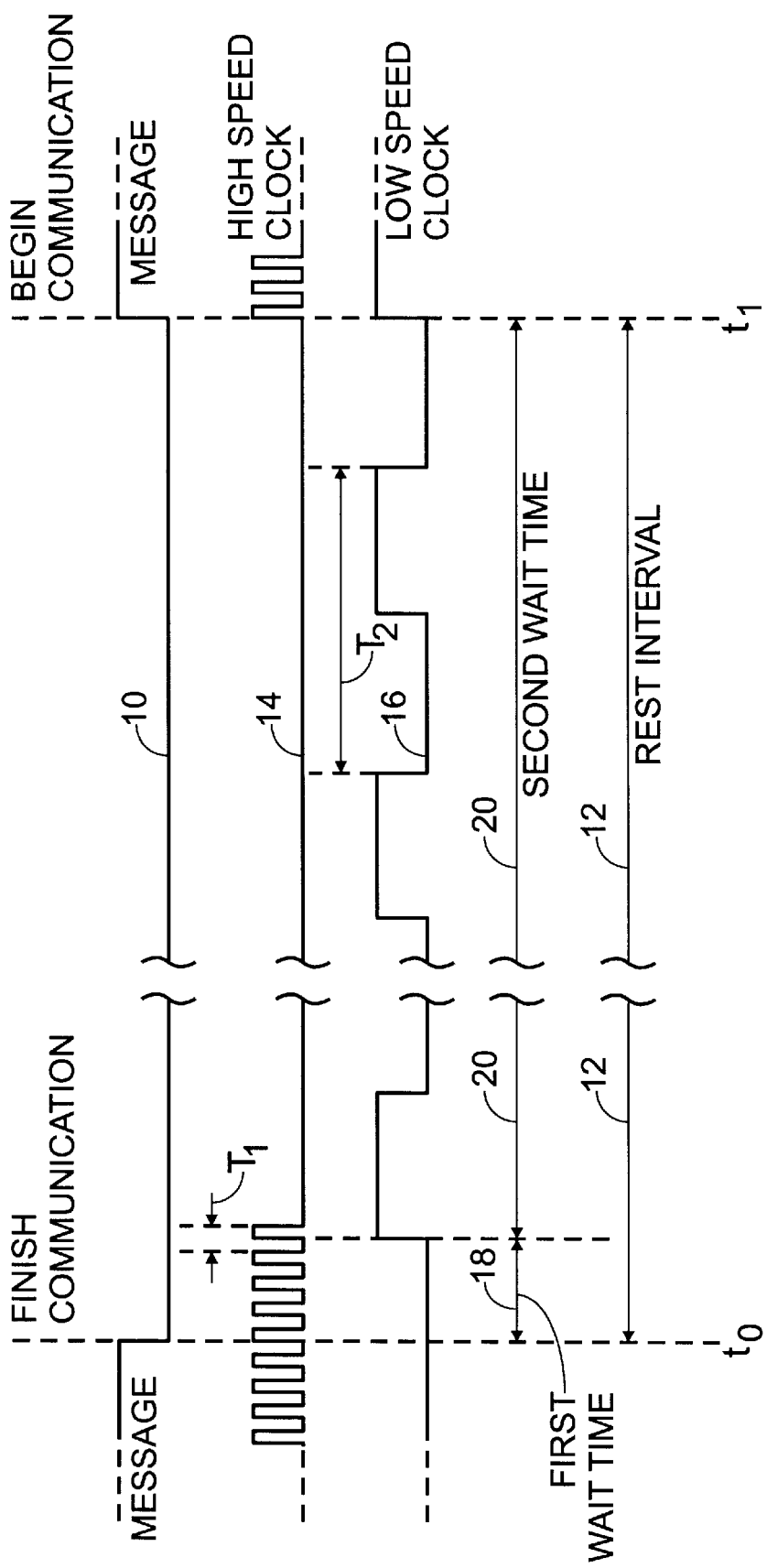
FIG. 2 is a timing diagram describing the relationship between the high speed clock, low speed clock, and elements of the rest interval.

FIG. 2 is a timing diagram describing the relationship between the high speed clock, the low speed clock, and elements of the rest interval. Message trace 10 indicates times when a player unit receives a communication, and the rest interval between these communication frames. Alternately, message trace 10 depicts times when a player unit transmits a message and the rest interval between transmissions. A communication frame is shown finishing at time $t_0$. A new communication frame is shown beginning again at time $t_1$. In the system described in FIG. 1, $t_0$ is the end of time slot 1. Then, $t_1$ is the beginning of time slot one during the next primary PCH. A rest interval shown by trace 12 occurs between the finished communication at $t_0$ and the beginning communication at $t_1$. In a synchronous communication system the rest interval time is known. The rest time may be constant, vary in response to the commands of an internal logic system, or vary in response to decisions made by the communicating base station. Some systems also have base stations repeat broadcasts in case a message is missed. In the case of the missed message, a receiving unit may remain fully powered to receive the message in a subsequent frame, or the rest interval is adjusted to monitor the subsequent message frame.

A high speed clock is shown depicted by trace 14. The high speed clock, or high speed oscillator, must run during the message frames. The high speed clock is ultimately responsible for timing the procedures involved in the demodulation, modulation, coding, and decoding of a received or transmitted message. These functions are both analog and digital, and vary according to the communication format and circuitry chosen. A low speed clock represented by trace 16 is also present. Since the rest interval can typically not be broken down into a whole number, or an integer number of low clock periods, a number of high speed clock periods must be added to the measurement of the rest interval to insure precise timing. In addition, some high speed clock periods are often added to, or subtracted from the measurement of the rest interval to account for inaccuracies and instability in the low speed clock.

The rest interval includes a first wait time represented by trace 18 and a second wait time represented by trace 20. The high speed clock periods needed to measure the rest interval are counted during the first wait time. With the beginning of the first full low speed clock period following time $t_0$, the counting of the second wait time begins. It is typical for there to be an indeterminacy of approximately one high speed clock period between the advent of the first wait time and the second wait time due to the lack of synch between clocks. In one aspect of the invention, shown in FIG. 2, the occurrence of the first full low speed clock period is made synchronous with the end of the first wait time. In this manner, the first wait time can be fully measured before the second wait time. Then, the end of the second wait time indicates the beginning of a new message frame and the requirement of an enabled high speed clock pulse train at $t_1$. FIG. 2 depicts the first low speed clock pulse beginning with the pulse rising edge. Alternately, the first full clock period begins with the falling edge. Likewise, the high speed clock period is begun with a rising and falling edge.

Figure 3:
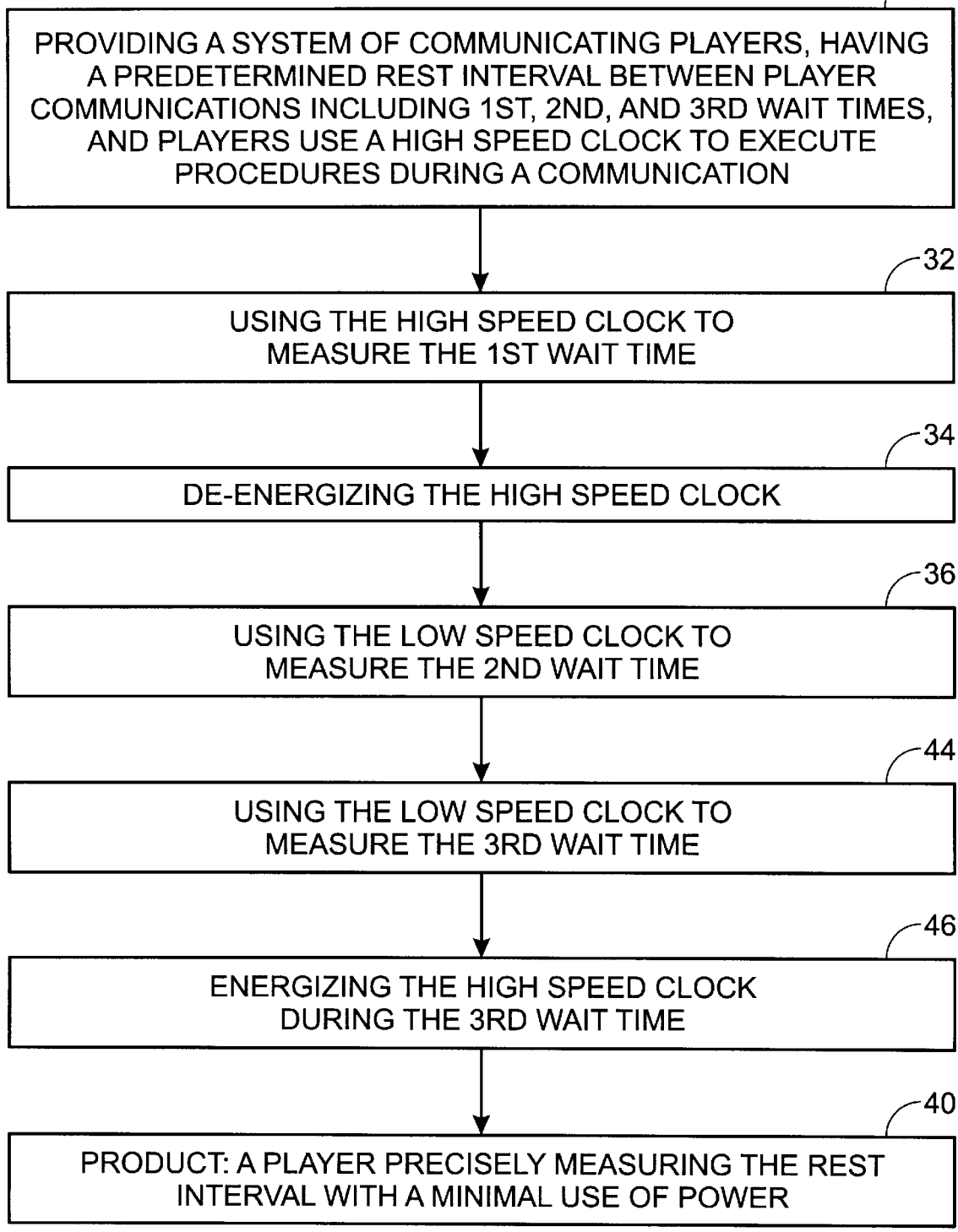
FIG. 3 is a flow chart illustrating the method for a player to conserve power by using a low speed clock in the measurement of a rest time interval.

FIG. 3 is a flow chart illustrating a method for a player to conserve power by using a low speed clock in the measurement of the rest time interval. Step 30 provides a wireless system of communicating players, having a predetermined rest interval between player communications, wherein the rest interval includes a predetermined first wait time and a predetermined second wait time significantly longer than the first wait time. The players use a high speed clock to execute procedures during a communication. As mentioned above, these procedures involve various modulation and demodulation functions in a receiver and transmitter. Step 32 uses the high speed clock to measure the first wait time, whereby a precisely timed rest interval maximizes the possibility of communication between players. Referring briefly to FIG. 2, the first wait time is depicted by trace 18 during a series of high speed clock periods are measured in order to determine the first wait time.

Referring to FIG. 3, Step 34 de-energizes the high speed clock to reduce power consumption. Referring again to FIG. 2, the high speed clock pulses of trace 14 are not shown during the second wait time represented by trace 20. A further step, following the measurement of the rest interval, enables the high speed clock to regulate the procedures of the next communication, whereby the use of the high speed clock is minimized.

Referring to FIG. 3, Step 36 uses the low speed clock to measure the second wait time. Referring again to FIG. 2, the low speed clock period represented by trace 16 operates a predetermined number of whole cycles to complete the timing of the second wait time, which is represented by trace 20. Referring again to FIG. 3, Step 40 is a product, a player unit using a power conservation method to precisely measure a rest interval with a minimal use of power.

Figure 4:
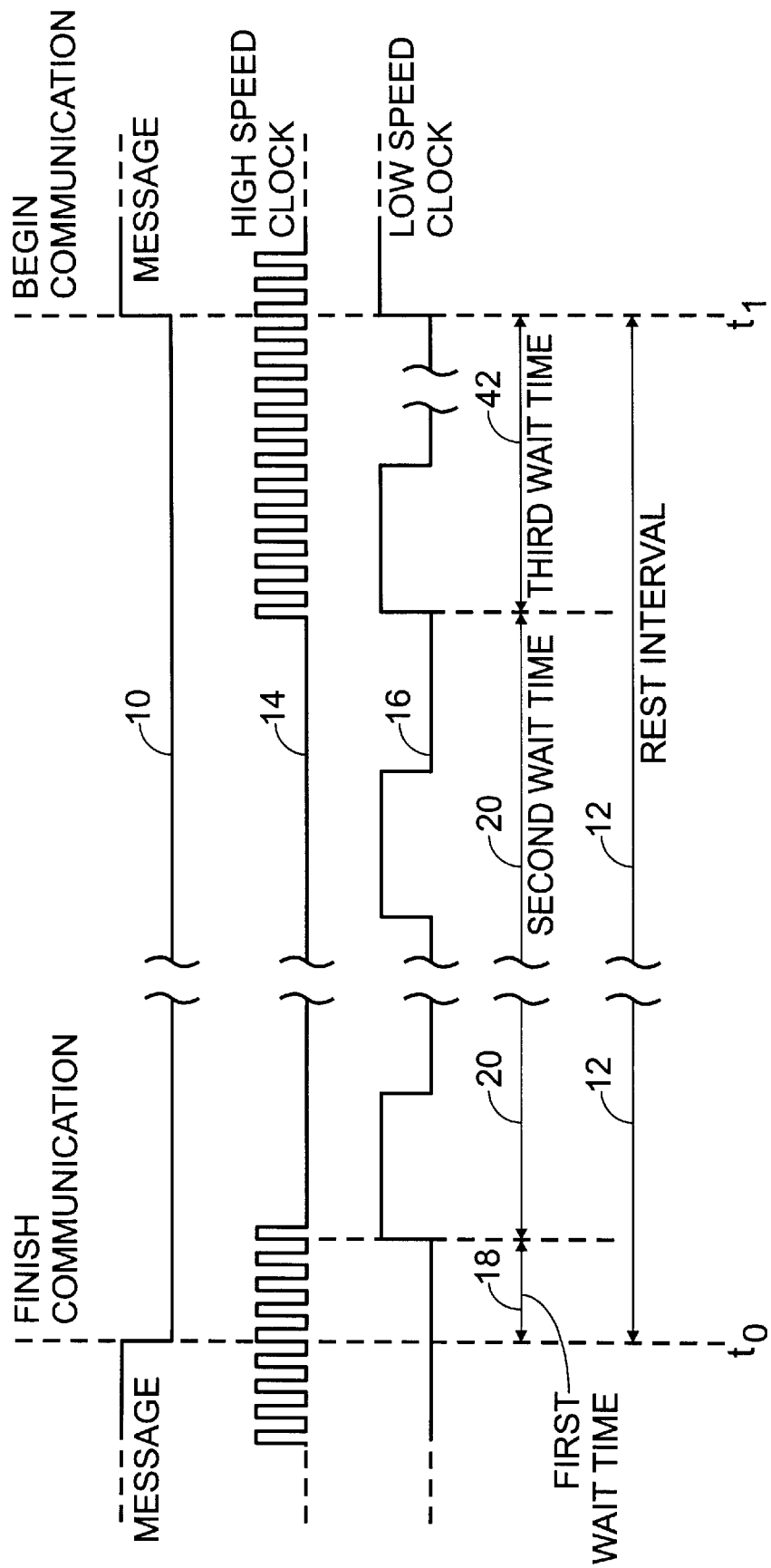
FIG. 4 is a more detailed description of the timing diagram of FIG. 2.

FIG. 4 is a more detailed depiction of the timing diagram of FIG. 2. In FIG. 4, the rest interval includes a predetermined third wait time represented by third wait time trace 42. During the third wait time the high speed clock is energized, or turned on. The purpose of the third wait time is to allow the high speed clock to stabilize before it is enabled, or used to manage communication circuits at time $t_1$. The high speed clock, represented by trace 14, is shown running during the third wait time 42. Typically, the third wait time is made up of a whole number of low speed clock periods. Third wait time 42 generally varies from approximately 1 to 10 milliseconds, depending on the type of oscillator in used, and the timing accuracy required. The phase of the low speed clock periods is arbitrary. A timing error of approximately one high speed clock period is typical in the transition from the first wait time to the second wait time. An error of up to one high speed clock pulse typically occurs in the transition of the system timing from low speed clock pulses to high speed clock pulses at time $t_1$.

Referring again to FIG. 3, one aspect of the invention provides that the rest interval includes a predetermined third wait time, and further steps. Following the measurement of the second wait time in Step 36, Step 44 uses the low speed clock to measure the third wait time. During the third wait time, Step 46 applies power to the high speed clock, stabilizing the high speed clock to operate at a selected period (frequency).

Figure 5:
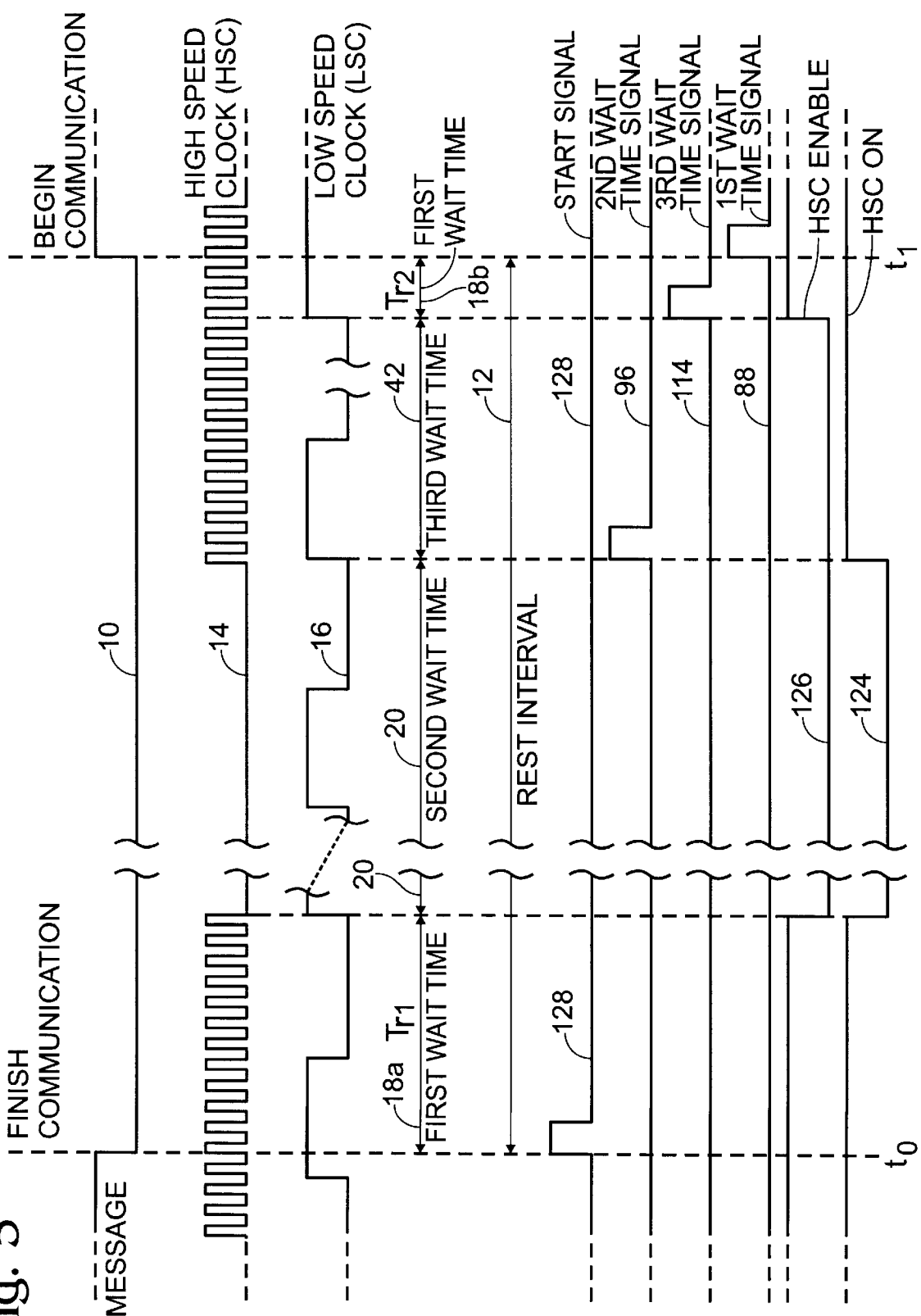
FIG. 5 is a more detailed description of the timing diagram of FIG. 4.

FIG. 5 is a more detailed depiction of the timing diagram of FIG. 4. In a preferred embodiment of the invention, the high speed and low speed clocks are not made to operate synchronously, as depicted in FIGS. 2 and 3, where the first wait time occurs before the second wait time begins. Synchronizing the high speed and low speed clocks adds complication to the system and method. Further, it requires that the periods of the high speed and low speed clocks remain accurate, or at least uniform, with respect to one another. For the clocks to remain asynchronous, the first wait time must be greater than, or equal to, a low speed clock period. That is, the counting of the first wait time can begin at any time with respect to the phase of the low speed clock period. The length of the first wait time (longer than 1 low speed clock period) insures that the start of the first low speed clock pulse cannot occur before the end of the first wait time. Alternately, the first wait time has the duration of several low speed clock periods, and the timing of the second wait time begins several low speed clock periods after $t_0$.

In FIG. 5, the first wait time is broken into two segments, $T_{r1}$ 18a, occurring before the second wait time, and $T_{r2}$ 18b, occuring after the third wait time and before $t_1$, when the next frame of communication begins. Since the high speed and low speed clocks are not synchronized, the number of high speed clock pulses occurring during time $T_{r1}$ 18a varies from zero to the number of high speed clock pulses in one period of a low speed clock. The counting of the first wait time is interrupted during the second and third wait times, and is completed during time $T_{r2}$ 18b. An error of up to, or approximately one high speed clock period occurs between the transition between $T_{r1}$ and the beginning of the second wait time. Likewise, an error in the timing of one high speed clock pulse period occurs between the end of the third wait time and time $T_{r2}$.

FIG. 5 is alternately described below. In a synchronous communication system including a plurality of receivers, with each receiver having a predetermined frame in which to receive a message and a predetermined rest interval between message frames, in which each receiver has a high speed clock, with a period $T_1$, to execute procedures during a message. A method of de-energizing the high speed clock and using a low speed clock, with a period of $T_2$, to measure the rest interval between message frames is described below. The method comprises a step (Step a) of dividing the rest interval by $T_2$, to obtain a whole number of low speed clock periods, $n_0$ in the rest interval, and a remainder period of time greater than, or equal to $T_2$, where $n_0=n_2+n_3$. A further step (Step b) waits a period of time equal to $T_{r1}$, where the remainder time determined in Step a) equals $(T_{r1}+T_{r2})$. A further step (Step c) disables the high speed clock and waits a period of time equal to $n_2 \times T_2$. Another step (Step d) energizes the high speed clock, and waits a period of time equal to $n_3 \times T_2$ for the high speed clock to stabilize. A final step (Step e) enables the high speed clock and waits a period of time equal to $T_{r2}$. In this manner, the receiver is prepared for a message in the next frame.

Figure 6:
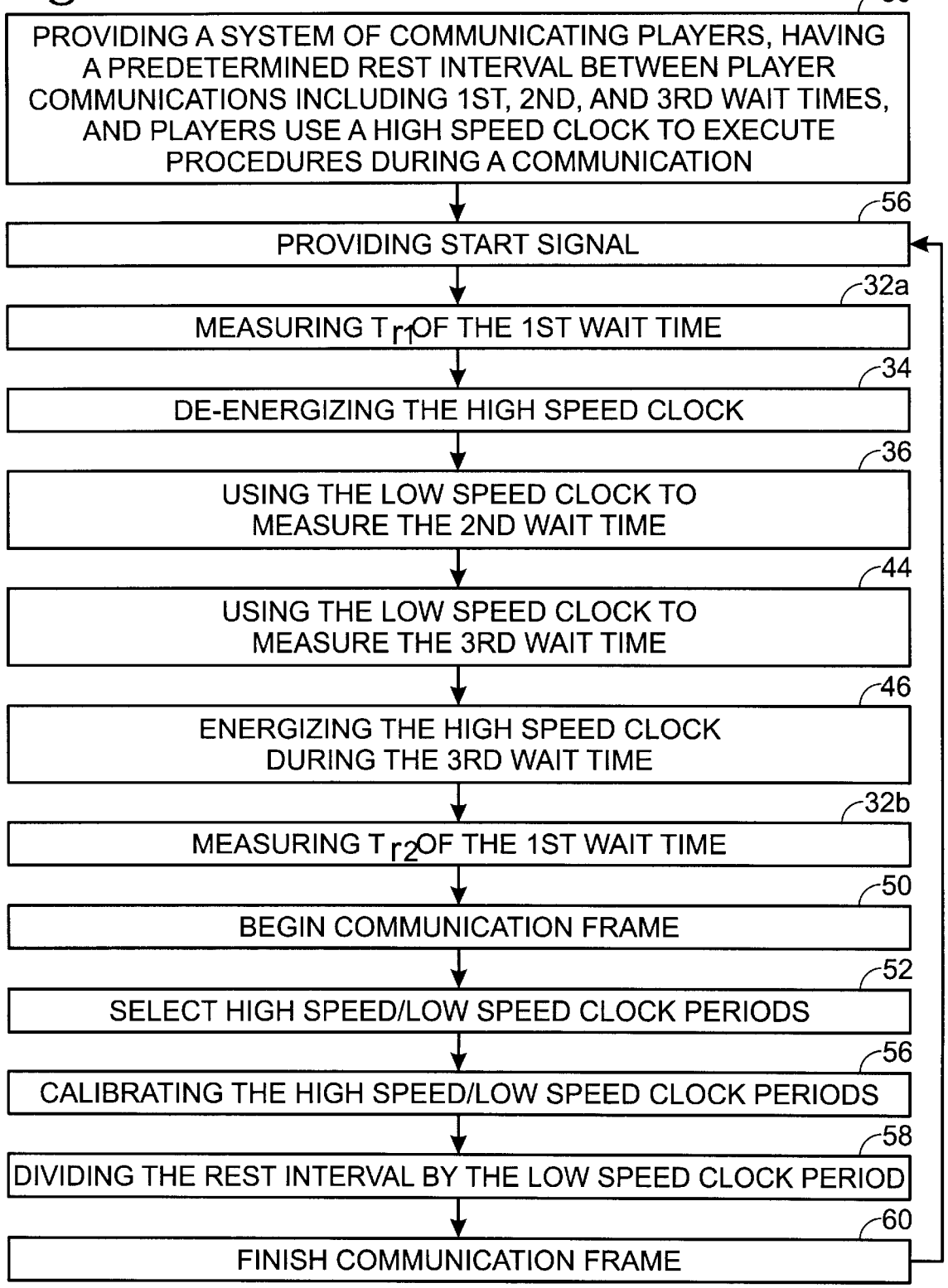
FIG. 6 is a more detailed depiction of the flow chart of FIG. 2.

FIG. 6 is a more detailed depiction of the flow chart of FIG. 2. Following the measurement of the first, second and third wait times, the next frame of communications begins at time $t_1$ (see FIG. 5). The method includes the further step, Step 52, of selecting high speed and low speed clock periods. Alternately, the high speed and low speed clock periods are selected in separate steps. The occurrence of Step 52 after the beginning of a communication frame is arbitrary. Alternately, the clock periods are selected in some other cycle of the synchronous communication scheme, such as before Step 32. In one aspect of the invention, Step 52 includes selecting a high speed clock period that is at least 100 times smaller than the low speed clock period. In this manner, significant reduction of power consumption occurs. In one aspect of the invention, the wireless system is a cellular telephone system using IS-136 standards and the communicating players are portable telephones. Then, the rest interval is approximately 1273.3 milliseconds (ms), and Step 52 includes a high speed clock period in the range between 10 and 50 nanoseconds (ns). In another aspect of the invention, Step 52 includes a low speed clock period of greater than approximately 30 microseconds ($\mu s$).

In one aspect of the invention, the actual period of the high speed clock varies from the period selected in Step 52, and the actual period of the low speed clock varies from the period selected in Step 52. That is, the accuracy and the stability of the clock permit the actual or measurable period to vary from the selected, or intended period. Significant savings in cost, size, and circuit complexity are often realized with the use of relatively inaccurate clocks, or clocks having relatively poor temperature stability. When inaccurate clocks are used, a reference clock is provided in Step 30, and a further step, Step 54, occurs of calibrating the high speed and the low speed clock periods so that the rest interval is accurately timed. Step 54 is realized in the sub-steps of measuring the actual period of the high speed clock with the reference clock, and measuring the actual period of the low speed clock with the reference clock. Then, another sub-step is included to adjust the values of $n_1$, $n_2$, and $n_3$ to compensate for the variance between the clock periods measured in Step 54, and the clock periods selected in Step 52, whereby precision rest intervals are measured with low accuracy clocks.

In one aspect of the invention, the system of communicating players operates with respect to a master clock having a predetermined master clock period that is transmitted to the players. Then a further step (not shown), before Step 54, includes adjusting the period of the reference clock to match the period of the master clock received by the player unit.

As shown in FIG. 5, the first wait time includes time periods $T_{r1}$ 18a and $T_{r2}$ 18b. Therefore, Step 32 of using the high speed clock to measure the first wait time is broken down into sub-steps. Step 32a occurs before Step 34, and Step 32b occurs after Step 44. Further, a start signal is provided in Step 56 to trigger the timing of the rest interval. Step 32 includes a sub-step 32a which measures $T_{r1}$ from the receipt of the start signal until the measurement of the second wait time begins in Step 36, when the high speed clock is disabled. Step 32 also includes the sub-step 32b to measure $T_{r2}$ after the measurement of the third wait time in Step 44, when the high speed clock is enabled. The first wait time is measured without regard to the phase of the low speed clock.

A Step 58 divides the rest interval by the low speed clock period selected in Step 52, to obtain a whole number of low speed clock periods, $n_0$, and a remainder approximately equal to the first wait time. In some aspects of the invention, the number $n_0$ is adjusted in response to the calibration of the high speed and low speed clocks in Step 54.

In one aspect of the invention, Step 44 includes multiplying the low speed clock period by a predetermined whole number, $n_3$ to measure the third waiting time. Step 36 includes multiplying the low speed clock period by $n_2$, where $n_2=n_0-n_3$, to measure the second wait time.

Some aspects of the invention include the additional step, not shown in FIG. 6, of dividing the remainder obtained in Step 58 by the high speed clock period to obtain a whole number of high speed clock periods, $n_1$. In some aspects of the invention, $n_1$ is adjusted in response to the calibration performed in Step 54. Step 32 then includes multiplying the high speed clock period by $n_1$ to determine the first wait time.

In the preferred embodiment of the invention, Step 58 includes obtaining an $n_0$ value, such that the first wait time is greater than, or equal to, the low speed clock period, whereby the first wait time is made large enough that the rest interval is measured with an asynchronous clock. Also in the preferred embodiment, Steps 52, 54, and 58 are performed before Step 56 so that the player unit is able to accurately time, and synchronize to the communication channel.

In one aspect of the invention, Step 36 includes beginning the measurement of the second wait time with the first full clock period following the receipt of the start signal in Step 56. In Step 60 the communication frame ends, and the cycle of timing rest interval 12 with a low speed clock begins again in Step 56.

Figure 7:
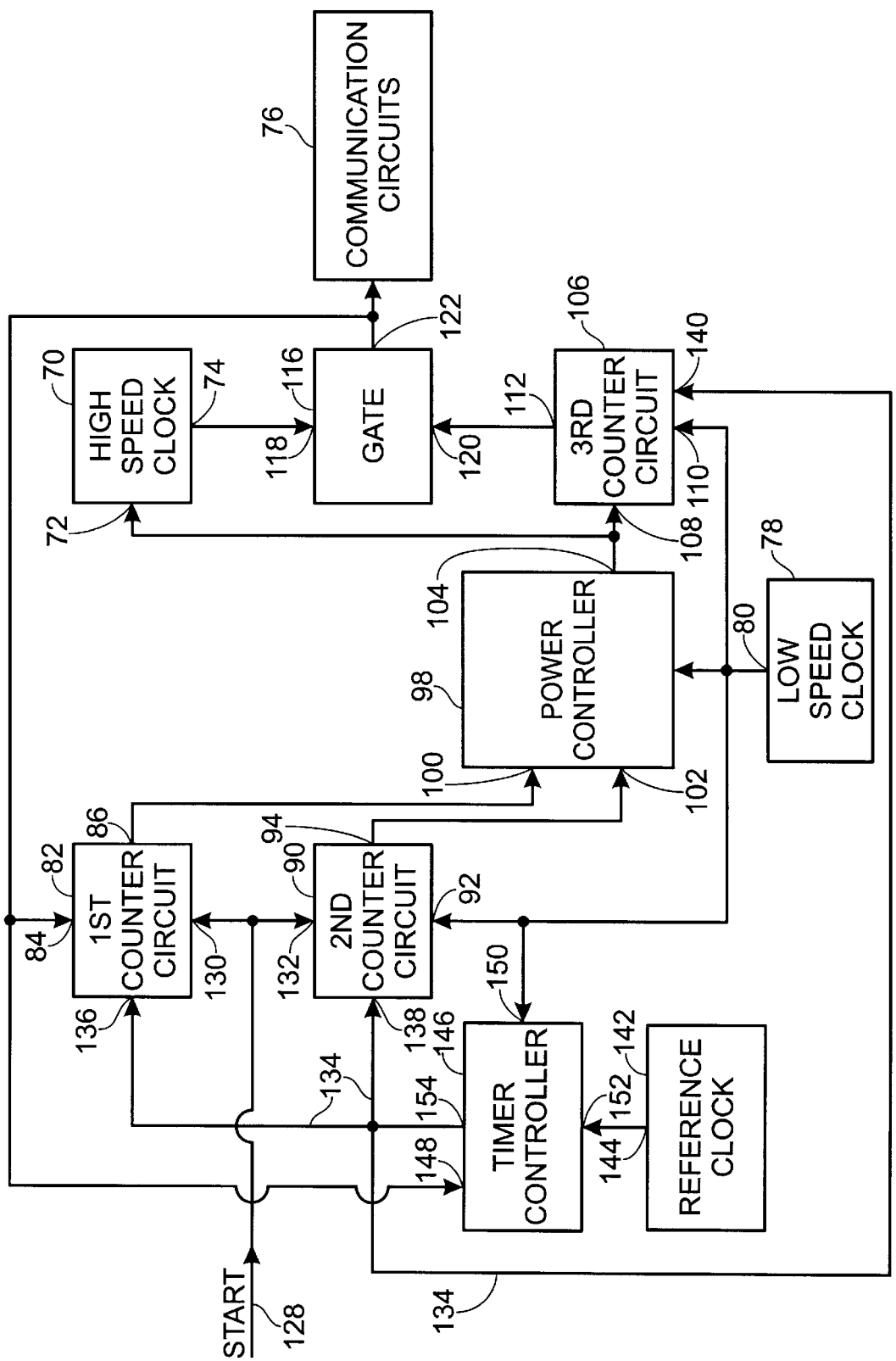
FIG. 7 is a description of a system for a player to conserve power between communications.

FIG. 7 is a block diagram depicting a system for a player unit to conserve power between communications. The power conserving player units operate in a wireless network of communicating player units having a predetermined rest interval between player unit communications, wherein the rest interval includes a predetermined first wait time and a predetermined second wait time, significantly longer than the first wait time (see FIGS. 2, 4 and 5). The system comprises a high speed clock 70 having an input 72 to energize high speed clock 70. That is, signals on input 72 turn high speed clock 70 on and off. When high speed clock 70 is off, it consumes no power. An output 74 operatively connects to communication circuits 76, providing a high speed clock period of $T_1$, or a high speed clock frequency of $1/T_1$. High speed clock 70 provides a clock period that is used to execute procedures during a communication. The interface between circuitry occurs in a series of steps managed by high speed clock 70. Likewise, the timing of messages, received and sent, in responsive to high speed clock 70. A low speed clock 78 has an output 80 to provide a low speed clock period $T_2$. High speed clock period $T_1$ and low speed clock period $T_2$ ale shown depicted in FIGS. 2, 4, and 5.

A first counter circuit 82 having a first input 84 is operatively connected to high speed clock output 74 to determine the first waiting time by counting a predetermined number, $n_1$ of high speed clock periods. First counter circuit 82 has an output 86 to provide a first wait time signal after the first wait time is counted. Referring to FIG. 5, the first wait time signal is represented by trace 88. First counter circuit 82 provides the fine resolution needed to accurately time the rest interval.

Referring once again to FIG. 7, the system comprises a second counter circuit 90 having an input 92 operatively connected to low speed clock output 80 to determine the second wait time by counting a predetermined number, $n_2$, of low speed clock periods. Second counter circuit 90 has an output 94 to provide a second wait time signal after the second wait time is counted. Referring to FIG. 5, second wait time signal is represented by trace 96. Second counter circuit 90 times the bulk of the rest interval to save power consumption by high speed clock 70.

A power controller circuit 98 having a first input 100 is operatively connected to first counter circuit output 86, a second input 102 is operatively connected to second counter circuit output 94, and an output 104 is operatively connected to high speed clock input 72, to de-energize (turn off) high speed clock 70 during the counting of the second wait time. Power controller circuit 98 also energizes (turns on) high speed clock 70 when the second wait time signal is received. In this manner, the rest interval is precisely timed despite high speed clock 70 being de-energized for a majority of the rest interval.

In some aspects of the invention, the power conservation system rest interval includes a third wait time, and further comprises a third counter circuit 106 having a first input 108 operatively connected to power controller circuit output 104 to trigger the counting of the third wait time when high speed clock 70 is energized. Third counter circuit 106 has a second input 110 operatively connected to low speed clock output 80 to determine the third waiting time by counting a predetermined number, $n_3$, of low speed clock periods. Third counter circuit 106 also has an output 112 to provide a third wait time signal after the third wait time is counted. Referring to FIG. 5, the third wait time signal is represented by trace 114.

The system further comprises a gating circuit 116 having a first input 118 operatively connected to high speed clock output 74, and a second input 120 operatively connected to third counter circuit output 112. Gating circuit 116 has an output 122 to provide high speed clock 70 period, enabling high speed clock 70 when the third wait time signal is received. In this manner, high speed clock 70 is allowed to stabilize before being enabled to activate communication circuits. Referring to FIG. 5, trace 124 shows the high speed clock being turned on at the end of the second wait time. Trace 126 shows the high speed clock being enabled, or provided to communication circuits 76 and first counter circuit 82, at the end of the first wait time ($t_1$). In some aspects of the invention, power controller has an additional output (not shown) used to signal that the next message frame has begun. Alternately, first counter circuit output 86 is used to signal the next possible communications beginning at time $t_1$.

In one aspect of the invention, the first wait time is greater than, or equal to the low speed clock period $T_2$, and a start signal is provided on line 128 to trigger the timing of the rest interval. First counter circuit 82 has a second input 130 to accept the start signal on line 128. First counter circuit 82 begins the counting of the first wait time following the receipt of the start signal on line 128. First counter circuit 82 suspends the first wait time count during the counting of the second and third wait times, when high speed clock 70 is not enabled. First counter circuit 82 finishes the first wait time count following the counting of the third wait time when high speed clock 70 is re-enabled.

Second counter circuit 90 has a second input 132 to accept the start signal on line 128. Second counter circuit 90 begins the counting of the second wait time with the first full low speed clock period following the receipt of the start signal on line 128. The rest interval is timed without the requirement of synching high speed clock 70 to low speed clock 78. As mentioned above, the system uses either the rising, or falling edge to signal the beginning of a full clock period, the choice of phase is arbitrary.

In one aspect of the invention, signals designating the values of $n_1$, $n_2$, and $n_3$ are provided on line 134. First counter circuit 82 has a third input 136 to accept the signal designating the value of $n_1$ on line 134. Second counter circuit 90 has a third input 138 to accept the signal designating the value of $n_2$ on line 134. Third counter circuit 106 has a third input 140 to accept the signal designating the value of $n_3$ on line 134. By providing the signals on line 134 the first, second and third wait time measurements are made variable. In many systems the values of $n_1$, $n_2$, and $n_3$ are communicated on a shared data bus. Alternately, the values are communicated through independent lines.

In one aspect of the invention, the wireless network is a cellular telephone system using IS-136 standards, and the communication player units are portable telephones. The rest interval is approximately 1280 ms in a very common format. Specifically, the rest time is approximately 1273.3 ms (1280–6.67). High speed clock 70 has an output period at least 100 times smaller than the period of low speed clock output 80. Low speed clock output 80 has a period greater than approximately 30 microseconds.

One aspect of the invention further comprises a reference clock 142 having an output 144 to provide a highly accurate, highly stable, reference clock period. The system also comprises a timer controller 146 having a first input 148 operatively connected to high speed clock output 74, a second input 150 operatively connected to low speed clock output 80, and a third input 152 operatively connected to reference clock output 144. Timer controller 146 divides the low speed clock period by the reference clock period to determine the actual period of low speed clock 78. Timer controller 146 divides the high speed clock period by the reference clock period to determine the actual period of high speed clock 70. Timer controller 146 has output 154, connected to line 134, to provide signals representing the values of $n_1$, $n_2$, and $n_3$. The calculation of the values for $n_1$, $n_2$, and $n_3$ is adjusted in response to the high and low speed clock periods to maintain accurate timing of the rest interval. Preferably, the high speed and low speed clocks 70 and 78 are allowed to time a number of communication cycles to determine their exact operating frequency, or period. With this information, and knowing the period of reference clock 142, timer controller 146 is able to determine the values of $n_1$, $n_2$, and $n_3$.

In one aspect of the invention, the player units are synchronized with respect to a transmitted master clock period, and reference clock 142 has an input (not shown) to accept the master clock period from the receiver of the player unit, to adjust the reference clock period to match the master clock frequency. That is, the master clock adjusts its timing to remain synchronized with a base station, or communicating players.

The present invention turns off the high speed clock during the rest interval so that the battery lifetime in a portable communications unit is extended. The power conservation occurs without sacrificing significant precision in the timing of the rest interval. As is well known in the art, rest interval timing is critical to avoid re-initialization, or missed messages, both of which require that the portable unit use additional energy. In the present invention, a majority of the rest interval is timed with a low speed clock, while a small amount of the rest interval, needed for adequate resolution, is timed with the high speed clock. The system is suitable for receivers, transmitters, and transceivers. In addition, the portable communications unit may vary the rest interval timing in response to internal logic commands, or base station commands. Variations and other embodiments of the present invention will occur to those skilled in the art.

What is claimed is:

1. In a wireless network of communicating player units having a predetermined rest interval between player unit communications, wherein the rest interval includes a predetermined first wait time and a predetermined second wait time, significantly longer than the first wait time, a system for a player unit to conserve power between communications comprising:

a high speed clock having an input to energize said high speed clock, and an output operatively connected to communication circuits to provide a high speed clock period, $T_1$, whereby said clock is used to execute procedures during a communication;

a low speed clock with a rate of power consumption that is low compared to said high speed clock, and having an output to provide a low speed clock period $T_2$;

a first counter circuit having a first input operatively connected to said high speed clock output to determine the first waiting time by counting a predetermined number, $n_1$, of high speed clock periods, said first counter circuit having an output to provide a first wait time signal after the first wait time is counted;

a second counter circuit having an input operatively connected to said low speed clock output to determine the second wait time by counting a predetermined number, $n_2$ of low speed clock periods, said second counter circuit having an output to provide a second wait time signal after the second wait time is counted;

a power controller circuit having a first input operatively connected to said first counter circuit output, a second input operatively connected to said second counter circuit output, and an output operatively connected to said high speed clock input, to de-energize said high speed clock during the counting of the second wait time, and to energize said high speed clock when the second wait time signal is received, whereby the rest interval is precisely timed despite said high speed clock being de-energized for a majority of the rest interval.

2. A power conservation system as in claim 1 wherein the rest interval includes a third wait time, and further comprising:

a third counter circuit having a first input operatively connected to said power controller circuit output to trigger the counting of the third wait time when said high speed clock is energized, and a second input operatively connected to said low speed clock output to determine the third waiting time by counting a predetermined number, $n_3$ of low speed clock periods, said third counter circuit having an output to provide a third wait time signal after the third wait time is counted;

a gating circuit having a first input operatively connected to said high speed clock output, and a second input operatively connected to said third counter circuit output, said gating circuit having an output to provide said high speed clock period, enabling said high speed clock when the third wait time signal is received, whereby said high speed clock is allowed to stabilize before being enabled to activate communication circuits.

3. A power conservation system as in claim 2 wherein the first wait time is greater than, or equal to the low speed clock period $T_2$, and a start signal is provided to trigger the timing of the rest interval, in which said first counter circuit has a second input to accept the start signal, said first counter circuit beginning the counting of the first wait time following receipt of the start signal, said first counter circuit suspending the first wait time count during the counting of the second and third wait times, when said high speed clock is not enabled, and said first counter circuit finishing the first wait time count following the counting of the third wait time when said high speed clock is re-enabled.

4. A method as in claim 3 in which said second counter circuit has a second input to accept the start signal, said second counter circuit beginning the counting of the second wait time with the first full low speed clock period following the receipt of the start signal, whereby the rest interval is timed without the requirement of synching said high and low speed clocks.

5. A power conservation system as in claim 4 wherein signals designating the values of $n_1$, $n_2$, and $n_3$ are provided, in which said first counter circuit has a third input to accept the signal designating the value of $n_1$, in which said second counter circuit has a third input to accept the signal designating the value of $n_2$, and in which said third counter circuit has a third input to accept the signal designating the value of $n_3$, whereby the wait times measurements are variable.

6. A power conservation system as in claim 1 wherein the wireless network is a cellular telephone system using IS-136 standards and the communication player units are portable telephones, wherein the rest interval is approximately 1273.3 ms, and in which said high speed clock output has a period at least 100 times smaller than the period of said low speed clock output.

7. A power conservation system as in claim 6 in which said low speed clock output has a period greater than approximately 30 $\mu$s.

8. A power conservation system as in 1 further comprising:

a reference clock having an output to provide a highly accurate, highly stable reference clock period;

a timer controller having a first input operatively connected to said high speed clock output, a second input operatively connected to said low speed clock output, and a third input operatively connected to said reference clock output, said timer controller dividing the low speed clock period by the reference clock period to determine the actual period of the low speed clock, and dividing the high speed clock period by the reference clock period to determine the actual period of the high speed clock, said timer controller having an output to provide signals representing the values of $n_1$, $n_2$, and $n_3$, whereby the calculation of the values for $n_1$, $n_2$, and $n_3$ are adjusted in response to the high and low speed clock periods to maintain accurate timing of the rest interval.

9. A power conservation system as in claim 8 wherein the player units are synchronized with respect to a transmitted master clock period, and in which said reference clock has an input to accept the master clock period from the receiver of the player unit, to adjust the reference clock period to match the master clock frequency.

* * * * *